(12) United States Patent
Burg et al.

(10) Patent No.: US 6,738,473 B1
(45) Date of Patent: May 18, 2004

(54) CALL QUEUING

(75) Inventors: Frederick Murray Burg, West Long Branch, NJ (US); Cameron Peters, Weston, MA (US)

(73) Assignee: AT&T Corp., New York, NY (US)

( * ) Notice: Subject to any disclaimer, the term of this patent is extended or adjusted under 35 U.S.C. 154(b) by 354 days.

(21) Appl. No.: 10/037,002

(22) Filed: Oct. 19, 2001

(51) Int. Cl.[7] ................................................ H04M 3/00
(52) U.S. Cl. ........................ 379/266.01; 379/266.06; 379/266.03
(58) Field of Search ..................... 379/266.01, 266.03, 379/266.06

(56) References Cited

U.S. PATENT DOCUMENTS 4,788,715 A * 11/1988 Lee ............................. 379/84
5,946,388 A * 8/1999 Walker et al. ........... 379/266.01
6,118,861 A * 9/2000 Gutzmann et al. ...... 379/201.01
6,563,916 B1 * 5/2003 Deutsch et al. ......... 379/215.01

* cited by examiner

Primary Examiner—Ahmad F. Matar
Assistant Examiner—Rasha S Al-Aubaidi

(57) ABSTRACT

A method enables call management on a queue. An incoming call is placed on a queue and may be suspended at a predetermined position for a predetermined period such that the call does not advance on the queue during the predetermined period. The predetermined position may be any desired position on the queue and the predetermined period may be a wait time or a number of calls on the queue, for example. The caller may further receive an estimated wait time or queue length and may request a maximum desired wait time, a change in wait time, or a change in communication method.

26 Claims, 4 Drawing Sheets

CALL QUEUING

FIELD OF THE INVENTION

The present invention relates to call management and more particularly to managing calls on a queue.

BACKGROUND OF THE INVENTION

Many business and customer service organizations rely upon call processing centers to service incoming customer telephone calls. As the number of incoming calls increases, however, the quantity of calls may exceed the capacity of the answering system, thus necessitating a call queuing system. In such a system, incoming calls are placed in a queue and typically answered in turn such that the first received call is answered first, for example.

Callers with calls on a queue have been frustrated by long wait times while waiting on queues because they have had to commit large amounts of time in order to have their calls answered. Moreover, during the wait, callers are unable to engage in other activities for fear of missing the opportunity in the event that the call is answered while the caller is momentarily away with the only alternative being losing one's place in the queue. Therefore, callers who do not wish to risk missing their opportunity to speak with a party on the receiving end of a call must stay on the line or, at the very least, remain close to the phone.

FIG. 1 illustrates the prior art method of call queuing and answering. A caller's incoming call is received (step 100) and placed on a queue (step 101). As calls are answered and removed from the queue, typically on a first-in-first-out basis, for example, all calls on the queue are sequenced (step 102). In this way, the caller's incoming call progresses through the queue in turn until his/her incoming call reaches the top of the queue (i.e., the next call to be answered). When the caller's incoming call reaches the top of the queue (step 103) and a call is to be answered, the caller's incoming call is answered (step 104).

The prior art method as illustrated in FIG. 1 does not allow the caller to reserve a position on the queue in such a way as to provide the caller with the freedom to leave the queue unattended without risking losing one's place in the queue. As a result, the caller must remain on the line and in close proximity to the communication device while waiting on the queue.

Thus, a need exists in the art to enable a caller on a queue to suspend a call on the queue such that the caller may leave a communication device unattended for a desired amount of time without losing one's place in the queue.

SUMMARY OF THE INVENTION

In an exemplary embodiment according to the present invention, a call may be received from a caller, placed in a queue and may advance in the queue. The call may be suspended at a predetermined position such as a present position in the queue determined by the caller or the system such that the call does not advance in the queue, thus permitting the caller to leave the communication device unattended for a desired amount of time without losing one's place in the queue. Suspension of advancement of the call in the queue may be maintained such that other calls in the queue may bypass the call until a command is received from the caller to resume advancement of the call in the queue, for example. Also, suspension of advancement of the call in the queue may be maintained while other calls on the queue bypass the call until a predetermined number of calls bypass the call at which time advancement of the call in the queue may be resumed. Alternatively, suspension of advancement of the call in the queue may be maintained for a predetermined period of time after which time, advancement of the call in the queue may be automatically resumed.

In another exemplary embodiment according to the present invention, a call may be received from a caller, placed in a queue and may advance in the queue. The caller may request information from the system which may include a wait time estimate, including an estimate of the required wait time until the call is answered; a request for queue length such as the number of calls in the queue ahead of the call, which may include a report from the system on the current position in the queue; a request for a change in communication mechanism such that the caller may record a voice mail message, send an e-mail, send a page or send a fax; a request for a change in wait time such that the call may be answered out of turn; or a request for a wait time limit such that the caller may not wait longer than the specified wait time limit.

It is understood that the present invention can take many forms and embodiments. The embodiments shown herein are intended to illustrate rather than to limit the invention, it being appreciated that numerous variations may be made without departing from the spirit of the scope of the invention.

DETAILED DESCRIPTION OF THE INVENTION

In the present invention, a method and system is provided for managing calls including call queuing. The calls may be made with a variety of communication devices such as telephones, wireless telephones, computers, etc., and by a variety of methods including over a Public Switched Telephone Network (PSTN) or Voice-over-Internet Protocol (VoIP), for example.

Figure 4:
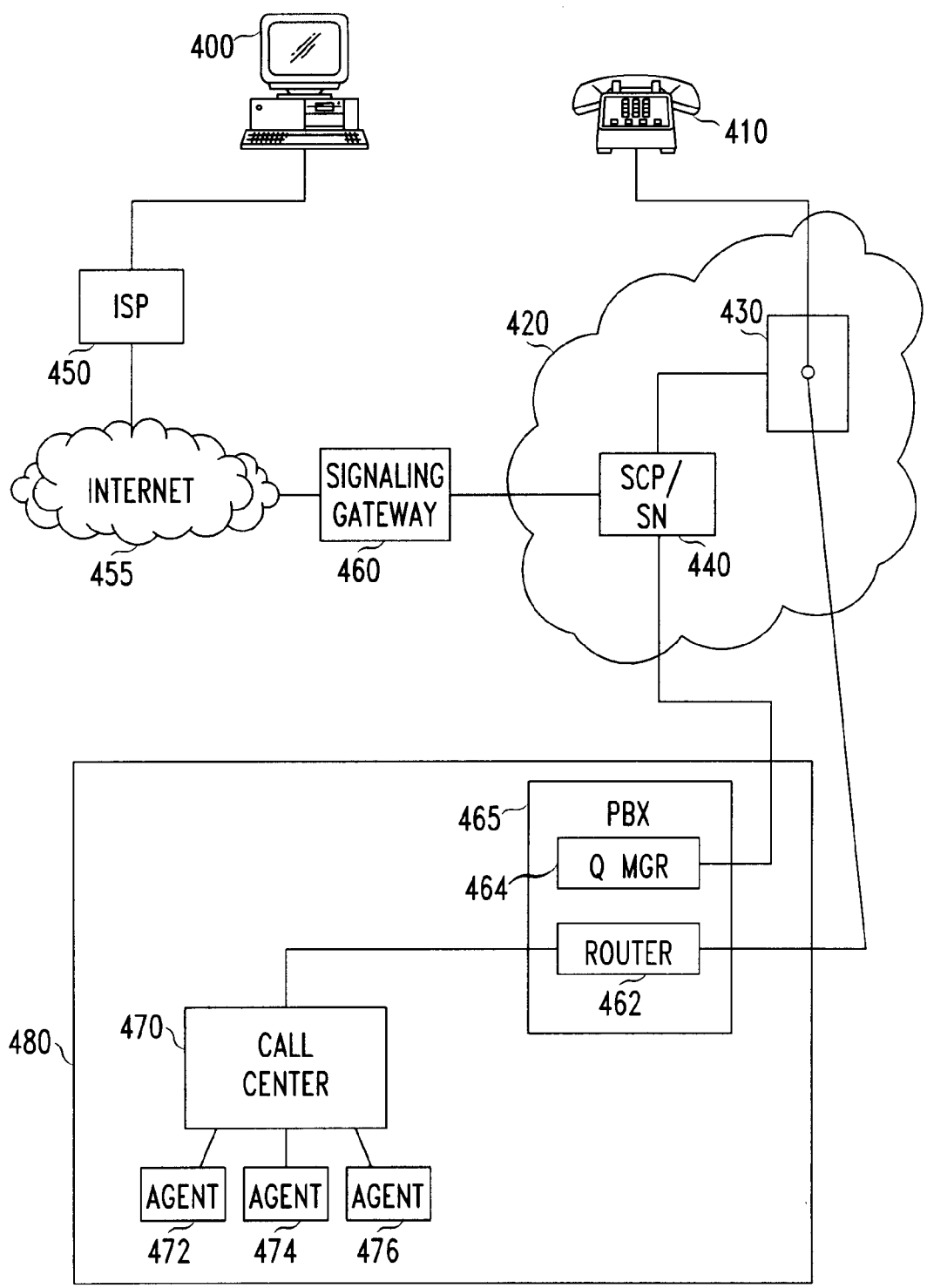
FIG. 4 is a block diagram showing a network in which the present invention may be applied.

FIG. 4 illustrates an exemplary system in which the present invention may be applied. The system corresponds to the system as disclosed in pending U.S. patent application Ser. No. 09/428,363, filed Oct. 27, 1999, Burg et al, which is incorporated herein by reference in its entirety. The exemplary system includes a computer 400 and communication devices including, but in no way limited to, a phone 410 as illustrated of a caller, a network 420, Internet service provider (ISP) 450, Internet 455, signaling gateway 460 that couples network 420 and ISP 450, and a call center location 480. The phone 410 may be coupled to a switch 430 of the network 420. The computer 400 may be coupled to ISP 450. The network 420 may include a Service Control Point/ Service Node (SCP/SN) 440, which may be co-located or may be separate entities, and a switch 430. The call center location 480 may comprise a Private Branch Exchange (PBX) 465 for routing calls with a router 462 or managing the queue with a queue manager 464, and a call center 470 for processing, managing and allocating calls among the agents (472, 474, and 476) of which three are illustrated in FIG. 4. The queue may be maintained in the Service Control Point (SCP) 440 or the Private Branch Exchange (PBX) 465, for example.

It is understood that the present invention is not so limited as many variations may be made while remaining within the scope and spirit of the present invention. For example, the service control point (SCP) and the service node (SN) while illustrated as being integrated as SCP/SN 440 in FIG. 4 may also be separate. Further, SN may be connected to the Internet 455. The SN may also send messages through the Internet 455 to the signaling gateway 460 or directly to the computer 400. The PBX 465 and/or the Call Center 470 may be connected directly to the Internet 455.

Figure 1:
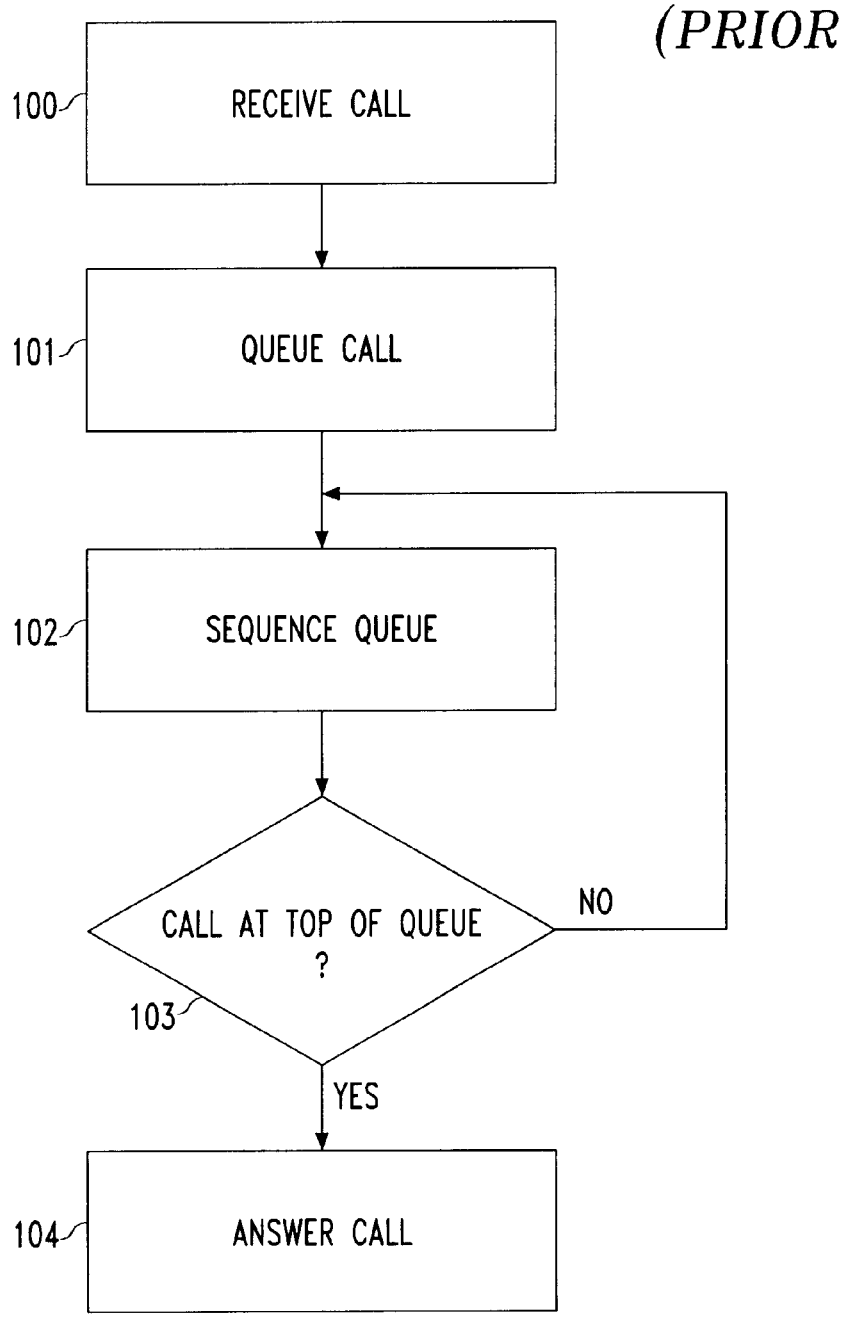
FIG. 1 is a flowchart illustrating the prior art method of call queuing and answering.
Figure 2:
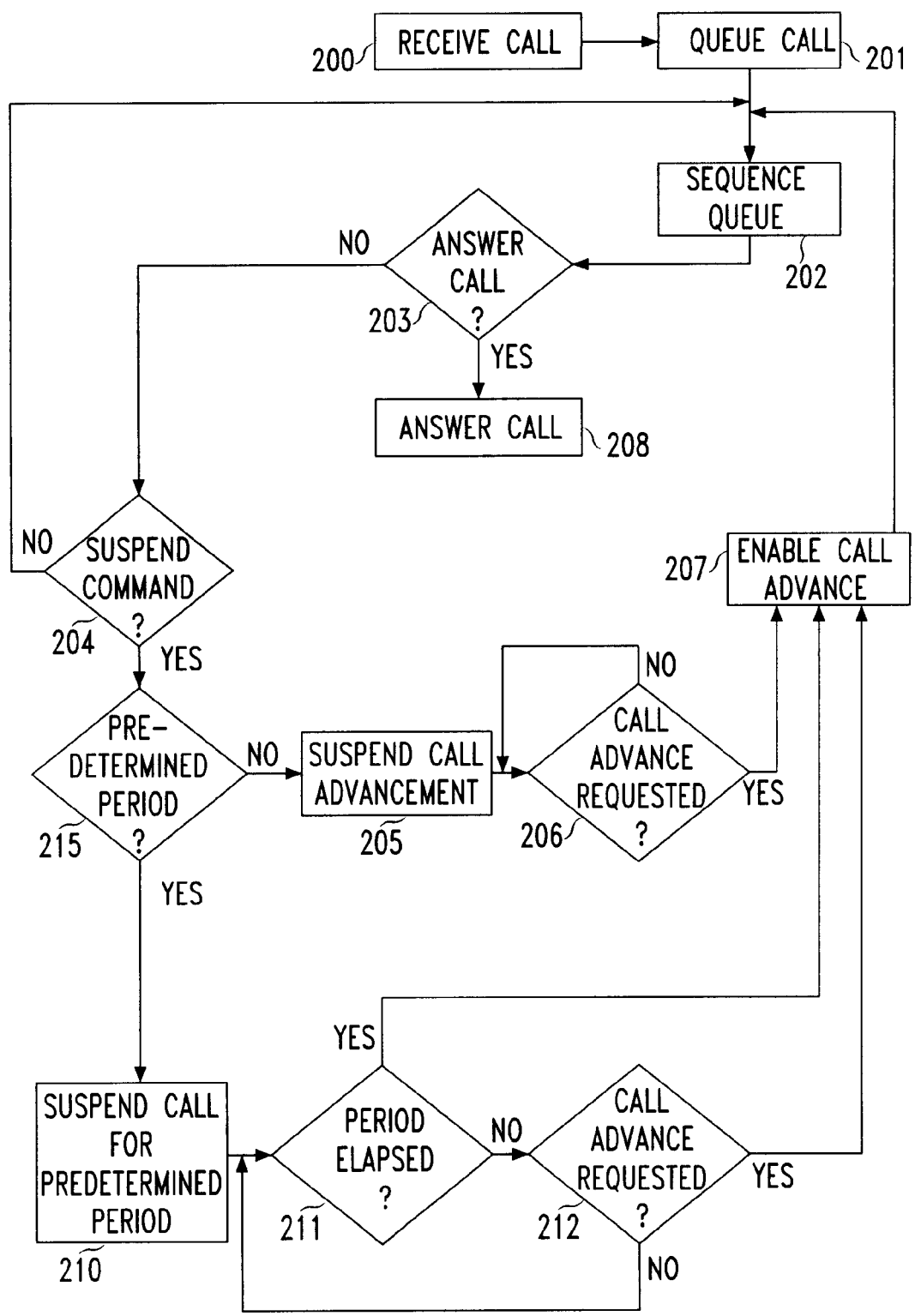
FIG. 2 is a flowchart illustrating an exemplary method of the present invention.

FIG. 2 is a flowchart that illustrates an exemplary embodiment of the present invention. In this example, an incoming call is received and placed on a queue (step 200, step 201). SCP/SN 440 of FIG. 4 may notify queue manager 464 of FIG. 4 when there is a new call requesting service. Queue manager 464 may respond to a new call notification from SCP/SN 440 by indicating either that the call can be serviced, or that the call must remain queued. When the call may be serviced, queue manager 464 may advise SCP/SN 440 that the queued call may be serviced and removed from the queue. As calls are answered and removed from the queue, all calls remaining on the queue are sequenced in the queue (step 202 of FIG. 2). When a new call may be serviced, queue manager 464 sends an availability reply to SCP/SN 440 and instructs the router 462 to connect the call to call center 470 of FIG. 4 for delivery to an available agent. Thus, if the incoming call may be immediately serviced, the call is answered (step 208 of FIG. 2). Otherwise, the incoming call may continue to be sequenced in the queue.

When the call cannot be immediately serviced, queue manager 464 sends an unavailability reply to SCP/SN 440 and sequencing of the calls remaining on the queue continues. In step 204 of FIG. 2, the caller may initiate suspension of progression of the call in the queue by, for example, inputting a command by pressing a code on the keypad of a telephone (i.e., Dual Tone Multi-Frequency (DTMF)), inputting a code through a computer keyboard, entering a voice prompt, or any of various input methods to suspend the call at a predetermined position such as a present position or a desired position, for example. The position may be indicated by the caller by inputting a position number or code, for example into a keypad (e.g., DTMF) or keyboard or by entering a voice prompt or voice command, for example. If a voice command is received, for example, known voice recognition means may receive the voice command such that the requested information is provided or the requested action is taken. As such, the present invention is not limited to any particular input method or code. Alternatively, the desired position or the predetermined position may be determined by the system.

The input command from the caller may be received at SCP/SN 440 to suspend the call at the predetermined position such as a present or desired position such that the SCP suspends the call on the queue accordingly. It is to be understood that the predetermined position in the queue may be any position in the queue that may be desired by a caller and is not limited to any particular position in the queue.

The queue may continue to be sequenced in turn as illustrated by the "NO" branch of step 204, for example, if input to suspend the call is not received from the caller.

On the other hand, if call advancement in the queue is suspended for the incoming call (step 205 of FIG. 2), other calls on the queue that are not suspended may continue to be sequenced in turn on the queue thereby permitting calls that are not suspended to pass ahead of the suspended call thereby bypassing the suspended call. In this example, the request for suspension of advancement of the call in the queue may be received in the SN/SCP 440. The SN may receive such a message and convey this to the SCP which may then sequence the calls on the queue accordingly. Thus, the caller may allow others in the queue to pass ahead in the queue, thereby affording the caller with the capability to leave the communication device, take a break, etc., without risking losing a position on the queue. As an alternative, the caller or the system may indicate the number of calls to bypass prior to resuming advancement of the caller's call in the queue. As an example, the caller may indicate a predetermined number of bypassing calls such that after the predetermined number of calls pass ahead in the queue, the caller's call may resume advancement in the queue.

As described, the predetermined position may be any position in the queue that may be desired such as, but not limited to, a current position or the top position in the queue. In this example, the incoming call remains in suspension until a command, input, request or similar response is received at the SCP/SN 440, for example, to resume advancement of the incoming call in the queue (step 2 of FIG. 2) at which time advancement of the incoming call in the queue may be enabled (step 207 of FIG. 2) at the SCP/SN 440 and the incoming call may be sequenced in the queue (step 202 of FIG. 2).

The caller may re-suspend and re-enable advancement of the incoming call in the queue as described, if desired, until the call is answered (step 208 of FIG. 2).

In another exemplary embodiment illustrated in FIG. 2, the caller may suspend advancement of the incoming call in the queue (step 204) for a predetermined period such that the call remains at a predetermined position such as a present position or any desired position during the period. Advancement of the call in the queue is resumed after the period has elapsed (step 215 and step 210, both of FIG. 2). Further, the predetermined period may be input or requested by the caller via keypad input (e.g., DMTF), keyboard input, voice input, for example, and may be a period of time or a number of queue positions. For example, the caller may input a code indicating a period of time to suspend the call in the queue via the keypad of the communication device (e.g., DMTF) or via a keyboard or the caller may speak the request into the communication device which may be received by known voice recognition means in the system such that a timer may be activated. The call may be suspended on the queue while the timer tracks the length of time. When the timer indicates that the input length of time has elapsed, the SCP 440 may resume the sequencing of the call. Alternatively, the caller may input a code indicating the queue position at which to suspend the call in the queue. When the call reaches the input queue position, the system may suspend the call as described. It is understood that the present invention is not so limited and that any of various input methods and many similar time limitations may be used without deviating from the scope or spirit of the present invention.

The caller may indicate the predetermined period by inputting a command by pressing a code on the keypad of a telephone (i.e., Dual Tone Multi-Frequency (DTMF)), inputting a code through a computer keyboard, entering a voice prompt, or any of various input methods to suspend the call at a predetermined position such as a present position or a desired position, for example. The SN may receive the message and convey this to the SCP which would sequence the queue accordingly while maintaining the position of the call in the queue for the predetermined period (step 210). Alternatively, the period may be defined by the system itself, thus obviating the need for caller input.

A caller may optionally resume advancement of the incoming call in the queue before the predetermined period has elapsed (step 212 of FIG. 2). If the predetermined period has elapsed ("YES" branch of step 211) or if the caller has requested to resume advancement of the incoming call in the queue before the predetermined period is complete ("YES" branch of step 212), then advancement of the incoming call is resumed (step 207) and sequencing of the incoming call in the queue may be performed.

The caller may re-suspend and re-enable advancement of the incoming call in the queue as described, if desired, until the call is answered (step 207).

Figure 3:
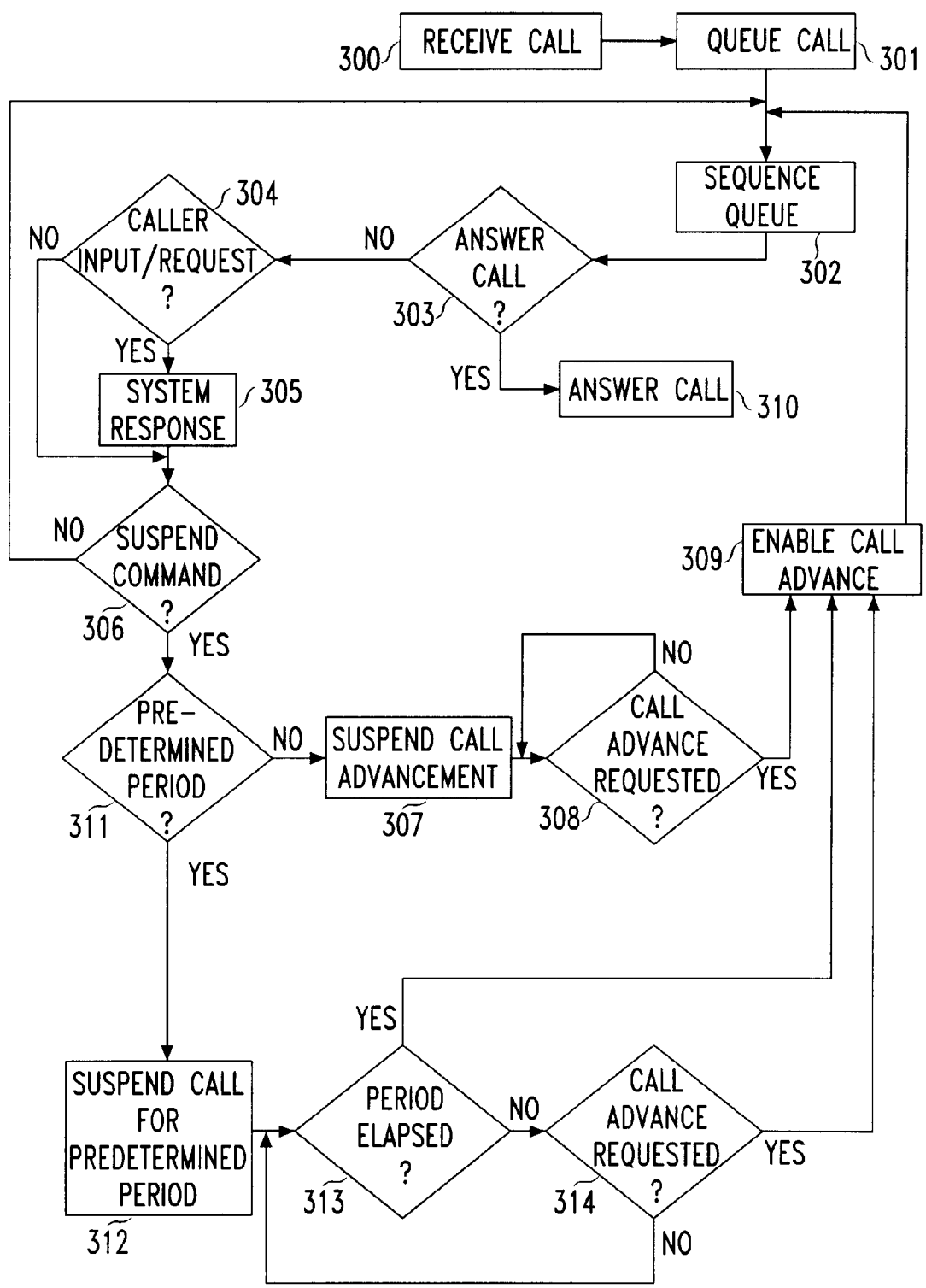
FIG. 3 is a flowchart illustrating aother exemplary method of the present invention.

FIG. 3 illustrates another exemplary embodiment of the present invention. In this example, as in the exemplary embodiment illustrated in FIG. 2, an incoming call is received (step 300) and placed on a queue (step 301). Queue manager 464 at the call center site 480 responds to a new call notification from SCP/SN 440 and informs SCP/SN 440 if the call may be immediately serviced and answered (step 310). If the call cannot be immediately serviced, the call may continue to be sequenced on the queue. As in the illustrative embodiment of FIG. 2, the call may be suspended at a predetermined position such as a present or desired position, either in response to caller input via a keypad (e.g., DMTF), keyboard, or voice, for example, the suspended call remaining suspended in the queue for a predetermined period of time that is determined either by the caller via similar input or by the system or the suspended call remaining suspended until receiving input from the caller to resume advancement of the call in the queue.

As calls are answered and/or removed from the queue, all calls remaining on the queue may be sequenced on the queue (step 302). If the incoming call may be serviced (step 303), the call center 470 notifies the queue manager 464 which forwards the notification to SCP/SN 440 and the call may be answered (step 310). Otherwise, the incoming call remains on the queue.

However, in the example illustrated in FIG. 3, the caller may also input into the system (step 304) a request for information or other form of input including, a wait time estimate, queue length including place in the queue, a change in communication mechanism, a request for a change in wait time, or a wait time limit, for example. A response is provided based on the caller input or request (step 305). It should be appreciated that the invention is not so limited and that a request for any relevant information would also be within the scope of the present invention.

If the request is a wait time estimate, for example, the system may provide an estimate of the approximate time of waiting until the call may be answered. If a caller received this information, for example, a decision may be made as to whether the caller wishes to wait the requisite amount of time. The request may be received at SCP/SN 440 which sends a status message to signaling gateway 460 of FIG. 4, for example, estimating the wait time on the queue. An example of a status message would be "Your call will be served in 5 minutes." The signaling gateway 460 may prepare a reply packet to the ISP 450 and computer 400 which may include a web page, audio announcement, pop-up window, etc.

If the request is queue length, for example, the system may provide a report on the number of calls in the queue ahead of the caller or the total number of calls waiting on the queue, for example. The system may further report the rank in the queue of the call. With this information, for example, a caller may decide whether to wait while the number of calls ahead of the caller are answered. For example, a caller may decide that there are too many calls ahead of him/her in the queue and call back later instead of waiting. The request may be received at SCP/SN 440. The signaling gateway 460 may prepare a reply packet to the ISP 450 and computer 400 which may include a web page, audio announcement, pop-up window, etc. The computer 400 would receive and display the queue information received.

If the request is a wait time limit, for example, the caller may specify the maximum amount of time that he/she is willing to wait. The message would be sent to the SN which would then inform the SCP of the amount of time. A timer may be associated with the user by the SCP and if the timer expires before the call is answered at the call center 470, for example, the SCP would have the SN query the caller with a menu listing. The signaling gateway 460 may forward data packets through the ISP 450 to the computer 400 allowing the caller to choose to wait additional time, choose alternative communications mechanisms, arrange another time for agent callback, request to be moved ahead in the queue, or disconnect the call, for example. Based on instructions received from the caller, the SN may instruct the SCP to remove the caller from the queue if the caller no longer wishes to wait on the queue.

If the request is a change in communication mechanism, the caller may request a change such that communication with the call center 470 is maintained in a manner other than direct contact. For example, the caller may prefer to send an email message to the call center. In this case, the signaling gateway may be instructed by the SN to present an e-mail window to the caller that could be filled in and sent back. The caller may also prefer to leave a voice-mail message, a page or a facsimile instead of waiting. If the caller chooses an alternative communications mechanism, the SN would inform the SCP to remove the caller from the queue.

If the request is to arrange for a return call, the caller may provide callback information which may include a phone number and/or available times to call, for example. In this example, the caller may decide that he/she does not wish to wait in the queue and would prefer to be called back by the called party at a designated time or during a designated time period. In this case, the caller may provide the callback information to the called party such that an agent would return the call at a later time which may correspond to an available time or which may be within a designated time period. In this example, the SN would inform the SCP to remove the caller from the queue. The signaling gateway or web-site may present a data input screen to the caller to input the call back information.

If the request is a change in wait time, the caller may alter the wait time necessary before the call is answered. For example, the caller may determine that the wait time is excessively long and may request that the wait time be shortened. A charge for this service may apply to the caller such that the caller may pay a fee to have his/her wait time curtailed. The call may be answered out of turn, for example, such that the call is answered earlier than it would have been answered had the request for change in wait time not been made.

The caller may initiate suspension of advancement of the incoming call in the queue (step 306). In this example, the suspension of advancement of the incoming call in the queue is maintained for a predetermined period (step 312) or suspension of advancement of the incoming call in the queue may be maintained until the caller re-establishes advancement of the call in the queue (step 307). The suspension may be initiated in response to caller input which may be, but is not limited to, via a keypad, keyboard or voice input, for example. Further, the predetermined period may be input or requested by the caller via keypad input, keyboard input, voice input, for example. It is understood that the present invention is not so limited and that any of various input methods may be used without deviating from the scope or spirit of the present invention.

The advancement of the incoming call is suspended at a predetermined position in the queue which may be, but is not limited to, a current position, a desired position, or the top position, for example. The suspension is maintained for the predetermined period (step 312) which may be a period of time or a number of calls on the queue, for example. A caller may request the enablement of advancement of the incoming call in the queue before the predetermined period has elapsed, if desired (step 314). If the predetermined period has elapsed or if the caller has requested enablement of advancement of the incoming call in the queue, then advancement of the incoming call is enabled (step 309) and sequencing of the incoming call in the queue may be performed (step 302).

The caller may re-suspend and re-enable advancement of the incoming call in the queue as described, if desired, until the call is answered (step 309).

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method for managing calls comprising the steps of:
   receiving a call;
   queuing the call in a queue;
   suspending the call at a predetermined position in the queue in response to caller input, the predetermined position being any position in the queue; and
   sequencing the queue while maintaining the position of the call at the predetermined position in the queue.

2. The method of claim 1 wherein the predetermined position is a current position.

3. The method of claim 1 wherein the predetermined position is a top position.

4. The method of claim 1 further comprising providing an estimated wait time, said estimated wait time being an estimate of the wait time until the call is answered.

5. The method of claim 4 wherein providing the estimated wait time is based on caller input.

6. The method of claim 1 further comprising providing queue length information, the queue length being the number of calls in the queue ahead of said call.

7. The method of claim 6 wherein providing the queue length information is based on caller input.

8. The method of claim 1 further comprising providing a selection of communication mechanisms.

9. The method of claim 8 wherein the communication mechanism is selected from the group consisting of voice-mail, e-mail, page and fax.

10. The method of claim 9 further comprising one of recording voice-mail, receiving e-mail, receiving a page or receiving a fax in response to a request for a change in the communication mechanism.

11. The method of claim 1 further comprising changing wait time.

12. The method of claim 11 wherein changing wait time is based on caller input.

13. The method of claim 1 further comprising setting a wait time limit, said wait time limit being a maximum desired wait time.

14. The method of claim 13 wherein setting the wait time limit is based on caller input.

15. The method of claim 13 further comprising transmitting a query to the caller if the call is not answered within the wait time limit.

16. The method of claim 1 further comprising receiving callback information from the caller.

17. The method of claim 16 wherein the callback information comprises one of a phone number or available times to call.

18. The method of claim 1 wherein said suspending is maintained for a predetermined period of time.

19. The method of claim 18 wherein the predetermined period of time is based on caller input.

20. The method of claim 1 further comprising advancing the call in the queue after said suspending and said sequencing steps.

21. The method of claim 20 wherein said advancing is based on caller input.

22. The method of claim 20 wherein the advancing of the call in the queue starts at the predetermined position.

23. The method of claim 1 wherein the call is placed via a computer.

24. The method of claim 23 wherein the call is Voice-over-IP (VoIP).

25. The method of claim 1 wherein the call is a telephone call placed via a Public Switched Telephone Network (PSTN).

26. The method of claim 1 wherein suspending the call allows a predetermined number of calls to bypass the call.

* * * * *